United States Patent
Zhu (10) Patent No.: US 10,902,415 B2
(45) Date of Patent: Jan. 26, 2021

(54) PAYMENT CARD BINDING METHOD, TRUST EVALUATION METHOD, APPARATUS, AND ELECTRONIC DEVICE

(71) Applicant: ADVANCED NEW TECHNOLOGIES CO., LTD., Grand Cayman (KY)

(72) Inventor: Jinbiao Zhu, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/880,315

(22) Filed: May 21, 2020

(65) Prior Publication Data
US 2020/0279248 A1    Sep. 3, 2020

Related U.S. Application Data

(63) Continuation of application No. PCT/CN2019/071110, filed on Jan. 10, 2019.

(30) Foreign Application Priority Data

Jan. 23, 2018  (CN) .......................... 2018 1 0064258

(51) Int. Cl.
*G06Q 40/00* (2012.01)
*G06Q 20/36* (2012.01)
(Continued)

(52) U.S. Cl.
CPC ....... *G06Q 20/367* (2013.01); *G06Q 20/3224* (2013.01); *G06Q 20/409* (2013.01)

(58) Field of Classification Search
CPC . G06Q 20/367; G06Q 20/3224; G06Q 20/409
See application file for complete search history.

(56) References Cited

U.S. PATENT DOCUMENTS 8,019,678 B2   9/2011  Wright et al.
8,032,448 B2   10/2011 Anderson et al.
(Continued)

FOREIGN PATENT DOCUMENTS

CN    101071490 A    11/2007
CN    101996381 A     3/2011
(Continued)

OTHER PUBLICATIONS

Ian Warren et al., "Push Notification Mechanisms for Pervasive Smartphone Applications," IEEE CS, Pervasive Computing (Year: 2014).*

(Continued)

*Primary Examiner* — Alexander G Kalinowski
*Assistant Examiner* — William B. Bunker (57) ABSTRACT

A payment card binding method, a trust evaluation method, an apparatus, and an electronic device are provided. The payment card binding method includes: receiving a payment card binding request; sending a payment request to a payment system; in response to the payment request being successfully processed by the payment system, determining (1) an account trust level, (2) a device trust level, and (3) an environment trust level; inputting the account trust level, the device trust level, and the environment trust level into a trained classifier to determine a new card trust level (NCTL); determining a payment limit restriction for the digital wallet account using the payment card on the computing device; and binding, based on the NCTL and the payment limit restriction, the digital wallet account with the payment card for the digital wallet account to use the payment card for future payments.

15 Claims, 4 Drawing Sheets

(51) Int. Cl.
*G06Q 20/32* (2012.01)
*G06Q 20/40* (2012.01)

(56) References Cited

U.S. PATENT DOCUMENTS

| | | | |
|---|---|---|---|
| 8,099,760 B2 | 1/2012 | Cohen et al. | |
| 8,473,318 B2 | 6/2013 | Nielson et al. | |
| 8,850,517 B2 | 9/2014 | Kumar | |
| 9,135,424 B2 | 9/2015 | Taveau et al. | |
| 9,485,267 B2 | 11/2016 | Baxley et al. | |
| 10,218,697 B2 * | 2/2019 | Cockerill | H04L 63/0823 |
| 2005/0091161 A1 | 4/2005 | Gustin et al. | |
| 2009/0030832 A1 | 1/2009 | Chien | |
| 2009/0240624 A1 | 9/2009 | James et al. | |
| 2010/0303230 A1 * | 12/2010 | Taveau | G06F 21/35 380/30 |
| 2011/0047044 A1 * | 2/2011 | Wright | G06Q 20/4016 705/26.35 |
| 2012/0130853 A1 * | 5/2012 | Petri | G06Q 30/0609 705/26.35 |
| 2014/0074717 A1 | 3/2014 | Evans | |
| 2014/0279474 A1 * | 9/2014 | Evans | G06Q 20/40 705/41 |
| 2015/0046339 A1 * | 2/2015 | Wong | G06Q 20/4016 705/71 |
| 2015/0066772 A1 | 3/2015 | Griffin et al. | |
| 2015/0120472 A1 * | 4/2015 | Aabye | G06Q 20/40 705/16 |
| 2015/0363783 A1 | 12/2015 | Ronca et al. | |
| 2016/0005029 A1 * | 1/2016 | Ivey | G06Q 20/409 705/44 |
| 2016/0078436 A1 * | 3/2016 | Tomasofsky | G06Q 20/4014 705/44 |
| 2016/0078443 A1 * | 3/2016 | Tomasofsky | G06Q 20/409 705/14.3 |
| 2016/0078444 A1 * | 3/2016 | Tomasofsky | G06Q 20/4016 705/44 |
| 2016/0132866 A1 | 5/2016 | Gui et al. | |
| 2016/0269908 A1 * | 9/2016 | Richards | G06Q 20/3223 |
| 2016/0379303 A1 | 12/2016 | Reich | |
| 2017/0193513 A1 * | 7/2017 | Zand-Biglari | G06Q 20/4016 |
| 2017/0286946 A1 | 10/2017 | Miao et al. | |
| 2018/0039989 A1 * | 2/2018 | Beye | H04L 67/10 |
| 2018/0082302 A1 * | 3/2018 | Chan-Bauza | G06Q 20/36 |
| 2018/0181964 A1 * | 6/2018 | Zagarese | G06Q 20/40145 |
| 2018/0330360 A1 | 11/2018 | Chen et al. | |
| 2019/0026756 A1 | 1/2019 | Fordyce, III et al. | |
| 2019/0057389 A1 * | 2/2019 | Carpenter | G06Q 20/4016 |
| 2019/0205867 A1 * | 7/2019 | Radu | G06Q 20/3674 |
| 2019/0354983 A1 | 11/2019 | Yu et al. | |

FOREIGN PATENT DOCUMENTS

| | | | |
|---|---|---|---|
| CN | 102542691 A | 7/2012 | |
| CN | 104106276 * | 10/2014 | G06Q 20/40 |
| CN | 104392347 A | 3/2015 | |
| CN | 104618415 A | 5/2015 | |
| CN | 105612543 * | 5/2016 | G06Q 20/3821 |
| CN | 105894279 A | 8/2016 | |
| CN | 106296187 A | 1/2017 | |
| CN | 106418952 A | 2/2017 | |
| CN | 106779701 A | 5/2017 | |
| CN | 106997530 A | 8/2017 | |
| CN | 107146076 A | 9/2017 | |
| CN | 107369019 A | 11/2017 | |
| CN | 107578230 A | 1/2018 | |
| CN | 108399543 A | 8/2018 | |
| WO | WO-2013082190 A1 * | 6/2013 | G06Q 20/4016 |
| WO | WO-2019105296 A1 * | 6/2019 | G06Q 20/34 |

OTHER PUBLICATIONS

Reuven Lerner, "The foreigner's guide to phone (WeChat + AliPay) payments in China," https://lerner.co.il/ (Year: 2018).*
Written Opinion and International Search Report for International Application No. PCT/CN2019/071110 dated Apr. 9, 2019.
Search Report for Taiwanese Application No. 107144504 dated Dec. 19, 2019.
First Search for Chinese Application No. 201810064258.6 dated Mar. 8, 2020.
Supplementary Search for Chinese Application No. 201810064258.6 dated May 18, 2020.
International Preliminary Report on Patentability Chapter I for PCT Application No. PCT/CN2019/071110 dated Aug. 6, 2020.

* cited by examiner

PAYMENT CARD BINDING METHOD, TRUST EVALUATION METHOD, APPARATUS, AND ELECTRONIC DEVICE

CROSS-REFERENCE TO RELATED APPLICATIONS

This application is a continuation application of International Patent Application No. PCT/CN2019/071110, filed on Jan. 10, 2019, which claims priority to Chinese Patent Application No. 201810064258.6, filed on Jan. 23, 2018. The entire content of the above referenced applications are incorporated herein by reference.

TECHNICAL FIELD

The application relates to the field of computer software technologies, and in particular, to a payment card binding method, a trust evaluation method, an apparatus, and an electronic device.

BACKGROUND

When a user uses a digital wallet for payment, the digital wallet often needs to be bound to more than one payment card.

When the user binds a new payment card to the digital wallet, a verification method that is mostly used is 3-D Secure and Micro Charge. 3-D Secure: based on a 3-D model authentication process, the 3-D includes an acquirer domain, an issuer domain, and an interoperability domain. Micro Charge: The digital wallet makes a random small payment to a credit card of the user. Please check if the user knows the amount for authentication.

However, verification manners of the two verification methods are relatively complex, and a payment failure rate (a probability of giving up card binding and payment) of the user is relatively high. According to statistics, payment failure rates of both solutions are more than 30%-40%.

SUMMARY

Embodiments of the specification are intended to provide a payment card binding method, a trust evaluation method, an apparatus, and an electronic device, so as to simplify a process of binding a new card and reduce a payment risk.

In order to resolve the foregoing technical problem, embodiments of the specification are implemented in a manner below.

In a first aspect, a payment card binding method is provided, including: receiving a payment card binding request from a digital wallet client installed on a computing device to bind a payment card with a digital wallet account, wherein the payment card binding request comprises account data of the digital wallet account, device data of the computing device, environment data of the computing device, and account information of the payment card; sending a payment request to a payment system according to the account information of the payment card; in response to the payment request being successfully processed by the payment system, determining (1) an account trust level based on the account data, (2) a device trust level based on the device data, and (3) an environment trust level based on the environment data; inputting the account trust level, the device trust level, and the environment trust level into a trained classifier to determine a new card trust level (NCTL), wherein the classifier comprises a plurality of weights respectively corresponding to the account trust level, the device trust level, and the environment trust level, and the plurality of weights are trained based on a plurality of historical payment card binding requests of a plurality of wallet accounts, and historical transaction data of the plurality of wallet accounts; determining, based on the NCTL, a payment limit restriction for the digital wallet account using the payment card on the computing device; and binding, based on the NCTL and the payment limit restriction, the digital wallet account with the payment card for the digital wallet account to use the payment card for future payments.

In some embodiments, the account data of the digital wallet account comprises at least one of following: an account identifier, a registration time, and an account owner's personal information.

In some embodiments, the device data of the computing device comprises at least one of following: a device identifier of the computing device, and a media access control (MAC) address of the computing device.

In some embodiments, the environment data of the computing device comprises at least one of following: a name of a wireless network connected to the computing device, IP address of the computing device, and location information of the computing device obtained by Location Based Service on the computing device.

In some embodiments, the sending a payment request to a payment system according to the account information of the payment card comprises: sending a withdrawal request to the payment system to withdraw a randomly generated amount from an account associated with the payment card; and receiving a success response from the payment system after the payment system approving the withdrawal request.

In some embodiments, the method further comprises recharging the randomly generated amount payment amount in the payment request into the account associated with the payment card.

In some embodiments, the method further comprises adjusting the NCTL based on payment refusal records and transaction records occurred after the digital wallet account being bound with the payment card.

In some embodiments, the method further comprises receiving a second payment request to make a payment with the digital wallet client using the payment card, wherein the second payment request comprises a payment amount; sending the second payment request to the payment system to process; determining whether the second payment request should be processed by the payment system according to the payment amount and the payment limit restriction; and if not, sending an offset request to the payment system to revoke the second payment request.

In some embodiments, the method further comprises receiving a second payment request to make a payment with the digital wallet client using the payment card, wherein the second payment request comprises a payment amount; determining whether the second payment request should be processed according to the payment amount, and the payment limit restriction; and if yes, sending the second payment request to the payment system to process.

In some embodiments, the determining (1) an account trust level based on the account data, (2) a device trust level based on the device data, and (3) an environment trust level based on the environment data comprises: sending, through an API of a risk control system, the account data of the digital wallet account, the device data of the computing device, and the environment data of the computing device to the risk control system; and determining, by the risk control system, the account trust level, the device trust level, and the environment trust level through corresponding machine learning models.

In a second aspect, a system for binding a payment card with a digital wallet account is provided. The system comprises a processor and a non-transitory computer-readable storage medium storing instructions executable by the processor to cause the system to perform operations comprising: receiving a payment card binding request from a digital wallet client installed on a computing device to bind a payment card with a digital wallet account, wherein the payment card binding request comprises account data of the digital wallet account, device data of the computing device, environment data of the computing device, and account information of the payment card; sending a payment request to a payment system according to the account information of the payment card; in response to the payment request being successfully processed by the payment system, determining (1) an account trust level based on the account data, (2) a device trust level based on the device data, and (3) an environment trust level based on the environment data; inputting the account trust level, the device trust level, and the environment trust level into a trained classifier to determine a new card trust level (NCTL), wherein the classifier comprises a plurality of weights respectively corresponding to the account trust level, the device trust level, and the environment trust level, and the plurality of weights are trained based on a plurality of historical payment card binding requests of a plurality of wallet accounts, and historical transaction data of the plurality of wallet accounts; determining, based on the NCTL, a payment limit restriction for the digital wallet account using the payment card on the computing device; and binding, based on the NCTL and the payment limit restriction, the digital wallet account with the payment card for the digital wallet account to use the payment card for future payments.

In a third aspect, a non-transitory computer-readable storage medium for binding a payment card with a digital wallet account is provided. The storage medium may be configured with instructions executable by one or more processors to cause the one or more processors to perform operations comprising: receiving a payment card binding request from a digital wallet client installed on a computing device to bind a payment card with a digital wallet account, wherein the payment card binding request comprises account data of the digital wallet account, device data of the computing device, environment data of the computing device, and account information of the payment card; sending a payment request to a payment system according to the account information of the payment card; in response to the payment request being successfully processed by the payment system, determining (1) an account trust level based on the account data, (2) a device trust level based on the device data, and (3) an environment trust level based on the environment data; inputting the account trust level, the device trust level, and the environment trust level into a trained classifier to determine a new card trust level (NCTL), wherein the classifier comprises a plurality of weights respectively corresponding to the account trust level, the device trust level, and the environment trust level, and the plurality of weights are trained based on a plurality of historical payment card binding requests of a plurality of wallet accounts, and historical transaction data of the plurality of wallet accounts; determining, based on the NCTL, a payment limit restriction for the digital wallet account using the payment card on the computing device; and binding, based on the NCTL and the payment limit restric-tion, the digital wallet account with the payment card for the digital wallet account to use the payment card for future payments.

It may be seen from the technical solutions provided by the foregoing embodiments of the specification that the solutions of the embodiments of the specification have at least one of the following technical effects:

In a first aspect, validity of the payment card is determined by initiating a payment to the payment card to be bound to the payment client, and based on at least one of the account data, the device data, and the environment data of the payment client, the trust evaluation parameter of the payment card is determined. Therefore, the binding process may be simplified, and a payment risk after the new card is bound is reduced.

In a second aspect, by receiving a trust evaluation parameter acquisition request sent by the payment server when the payment card is valid, the trust evaluation parameters are fed back to the payment server, for the payment server to bind the payment card based on the trust evaluation parameters. Therefore, a new card binding process is simplified, and a payment risk after the new card is bound is reduced.

BRIEF DESCRIPTION OF THE DRAWINGS

To describe the technical solutions in the embodiments of the specification or in the existing technologies more clearly, the following briefly introduces the accompanying drawings required for describing the embodiments or the existing technologies. Apparently, the accompanying drawings in the following description show merely some embodiments of the specification, and a person of ordinary skill in the art may still derive other drawings from these accompanying drawings without creative efforts.

DETAILED DESCRIPTION OF THE INVENTION

Embodiments of the specification provide a payment card binding method, a trust evaluation method, an apparatus, and an electronic device.

To enable a person skilled in the art to better understand the technical solutions of the specification, the technical solutions of the embodiments of the specification will be described clearly and thoroughly below with reference to the accompanying drawings of the embodiments of the specification. Apparently, the described embodiments are merely some rather than all of the embodiments of the specification. All other embodiments obtained by a person of ordinary skill in the art based on the embodiments of the specification without creative efforts shall fall within the protection scope of the specification.

Figure 1:
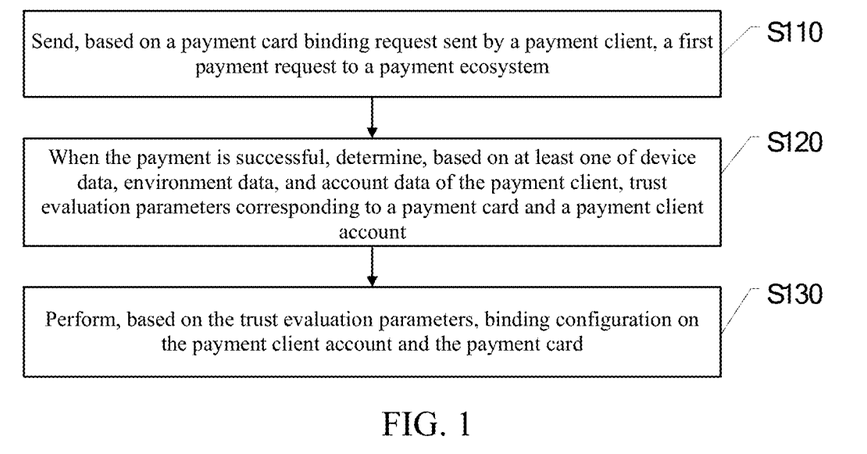
FIG. 1 is a flowchart of a payment card binding method, according to the specification.

FIG. 1 is a flowchart of a payment card binding method, according to the specification. The method in FIG. 1 may be applied to a payment server, such as an electronic wallet server, and an Alipay system server, etc. The method in FIG. 1 may include below.

S110. Send, based on a payment card binding request sent by a payment client, a first payment request to a payment ecosystem.

In some embodiments, the payment client may be an electronic wallet client and so on. In a payment client account, a user may bind a new payment card, such as a credit card, a debit card, and a Visa card, etc. In this case, the user may send a payment card binding request to a payment server to perform a payment card binding process.

In some embodiments, the payment ecosystem refers to a payment service provider, including an acquirer, a card organization, and a card issuer (a card issuing bank) etc. In some embodiments, the acquirer may provide payment and clearing services to a merchant and forward a transaction to the card connection organization. The card organization may transfer the transaction to the card issuer, and is responsible for settlement among the acquirer and the card issuer. The card issuer is responsible for providing a card product to a consumer, such as a bank card applied at a bank, etc. In some embodiments, the transaction process between payment ecosystems is not limited in the specification, and other possible implementation for the payment ecosystems are not excluded.

After receiving the payment card binding request sent by the payment client, the payment server may send a first payment request to the payment ecosystem to verify validity of the payment card.

In some embodiments, when sending the first payment request, the payment server may initiate a micro-payment request to verify the validity of the payment card. The payment server may initiate a payment request (withdrawal request) to the payment ecosystem through a withdrawal transaction message. If the payment ecosystem responds to the payment request and feeds back a payment success result, it means that the payment card is valid. On the contrary, if the payment ecosystem feeds back a payment failure result, it means that the payment card is invalid. In this case, subsequent steps are not performed any more.

In some embodiments, an amount in the payment request may be fixed or random. For example, deduction of 0.13 Yuan may be randomly sent, and so on.

S120. When the payment is successful, determine, based on at least one of device data, environment data, and account data of the payment client, trust evaluation parameters corresponding to the payment card and a payment client account.

In some embodiments, the device data of the payment client may include: for example, a device ID and/or a device MAC address, etc. Based on the device data of the payment client, a device trust level may be determined. For example, if a device is a device commonly used by the payment client account, the device trust level and the corresponding trust evaluation parameter may be higher. If the device is a device used by the payment client account for the first time, the device trust level and the corresponding trust evaluation parameter may be lower. For another example, if the device has a fraud history, the device trust level and the corresponding trust evaluation parameter may be lower.

The environment data of the payment client may include: for example, a name of a WIFI connected to a terminal device at which the payment client is located, a MAC address of the WIFI, a geographic location (latitude and longitude information) of the device, and an IP address field. Based on the environment data of the payment client, an environment trust level may also be determined. Similarly, if the environment data indicates that the user is not in a resident location, such as being abroad, the environment trust level is lower, and the corresponding trust assessment parameter is lower.

The account data of the payment client may include: for example, a payment client account ID, registration time, a customer name, a gender, an address, an age, a funding channel, and customer data modification history, etc. Based on the account data of the payment client, an account trust level may also be determined. For example, if an age corresponding to the payment client account is between 30 and 40, the account trust level is higher. If the age corresponding to the payment client account is between 8 and 12, the account trust level is lower. For another example, if the payment client account has a fraud history, the account trust level is lower, and so on.

Based on one or more of the device data, the environment data, and the account data, the trust evaluation parameters corresponding to the payment card and the payment client account may be determined.

S130. Perform, based on the trust evaluation parameters, binding configuration on the payment client account and the payment card.

In some embodiments, the trust evaluation parameters may be used to determine a payment limit restriction. For example, after the trust evaluation parameters are determined, the payment client account may be bound to the payment card based on the trust evaluation parameters.

In some embodiments, the trust evaluation parameters include at least one of the following: a payment card trust level and payment restrictions associated with the payment card trust level. In some embodiments, in the process of binding a new card, a risk control system may feed back to the payment server at least one of a new card trust level (NCTL) and one or more payment restrictions corresponding to the NCTL.

Correspondingly, step S130 may be implemented in a manner below. When the payment client account is bound to the payment card, based on the trust evaluation parameters, at least one of a trust level and payment restrictions of the payment card in the payment client account is set.

For example, it is assumed that the risk control system has five NCTL levels of 0, 1, 2, 3, and 4. A higher NCTL level means a higher trust level with lower risk. It is further assumed that the payment restrictions corresponding to all of the NCTL levels are 0 Yuan, 100 Yuan, 500 Yuan, 1000 Yuan, and 2000 Yuan, respectively. When the risk control system determines that the NCTL level is 1 based on the device data of the payment client, the environment data of the payment client, a payment card identifier, and the account data of the payment client, etc., the level 1 may be fed back to the payment server, or a payment restriction of 100 Yuan may be fed back to the payment server, or information about both the level 1 and 100 Yuan are fed back to the payment server. In some embodiments, in this example, if it is determined that the NCTL is a level 0, it means that a confidence level of the payment card is extremely low, and the payment client account bound to the payment card has a higher risk.

In this embodiment, the validity of the payment card is determined by initiating a payment to the payment card to be bound to the payment client, and based on at least one of the account data, the device data, and the environment data of the payment client, the trust evaluation parameter of the payment card is determined. Therefore, the binding process is simplified, and a payment risk after the new card is bound is reduced.

In some embodiments, the payment server may include a risk control module for determining, based on at least one of the device data, the environment data, and the account data of the payment client, the trust evaluation parameters corresponding to the payment card and the payment client account.

In some embodiments, as another embodiment, the payment server has no risk control module. In this case, the step S120 may be implemented as a manner below: a trust evaluation parameter acquisition request about the payment card and the payment client account is sent to the risk control system, the trust evaluation parameter acquisition request carrying at least one of the device data, the environment data, and the account data of the payment client, and the payment card identifier; and a trust evaluation parameter fed back by the risk control system is received based on the trust evaluation parameter acquisition request.

In some embodiments, after the step S130, the method may further include: a payment amount in the first payment request is recharged into the payment client account.

In some embodiments, after the step S130, the method may further include: sending a second payment request of the payment card under the payment client account to the payment ecosystem; and a trust evaluation is performed on the second payment request to determine whether to allow the second payment request.

In some embodiments, when the payment server receives the payment request of the payment card sent by the payment client account, the payment request may be sent to the risk control system to perform risk verification on the payment request. The risk control system may determine whether to allow the payment based on payment refusal data, transaction data, and trust level data of the payment card, as well as a payment limit carried in the payment request. The risk verification of the payment request by the risk control system may further reduce the payment risk after the payment card is bound.

Further, the method further includes: if the second payment request is not allowed, an offsetting is performed on the payment ecosystem based on the second payment request.

In some embodiments, in the step of performing a trust evaluation on the second payment request to determine whether to allow the second payment request, when the payment server has no risk control module, the step may be implemented in a manner below: a verification request for the second payment request is sent to the risk control system, the verification request carrying the payment card identifier, the payment client account, and the payment amount of the second payment request; and a response from the risk control system to the verification request is received, the response being determined by the risk control system based on the trust evaluation parameters corresponding to the payment card and the payment client account, and the payment amount of the second payment request.

In some embodiments, the response may further carry the trust evaluation parameters adjusted by the risk control system. The method further includes:

based on the adjusted trust evaluation parameters, binding parameters of the payment client account and the payment card are reset.

Correspondingly, if the payment server has the risk control module, after the step S130, the method may further include:

Based on the payment refusal data, transaction data, and trust evaluation parameters after the payment card is bound to the payment client account, the trust evaluation parameters corresponding to the payment card and the payment client account are adjusted.

When the trust evaluation parameters are adjusted based on the payment refusal data, transaction data, and the current trust evaluation parameters, the payment restrictions may be adjusted with an increase in the number of transaction times of the bound payment card, for the payment restrictions to match the payment client account, payment card, device, environment and other factors.

Next, the method in the specification is further described in combination with a specific embodiment.

Figure 2:
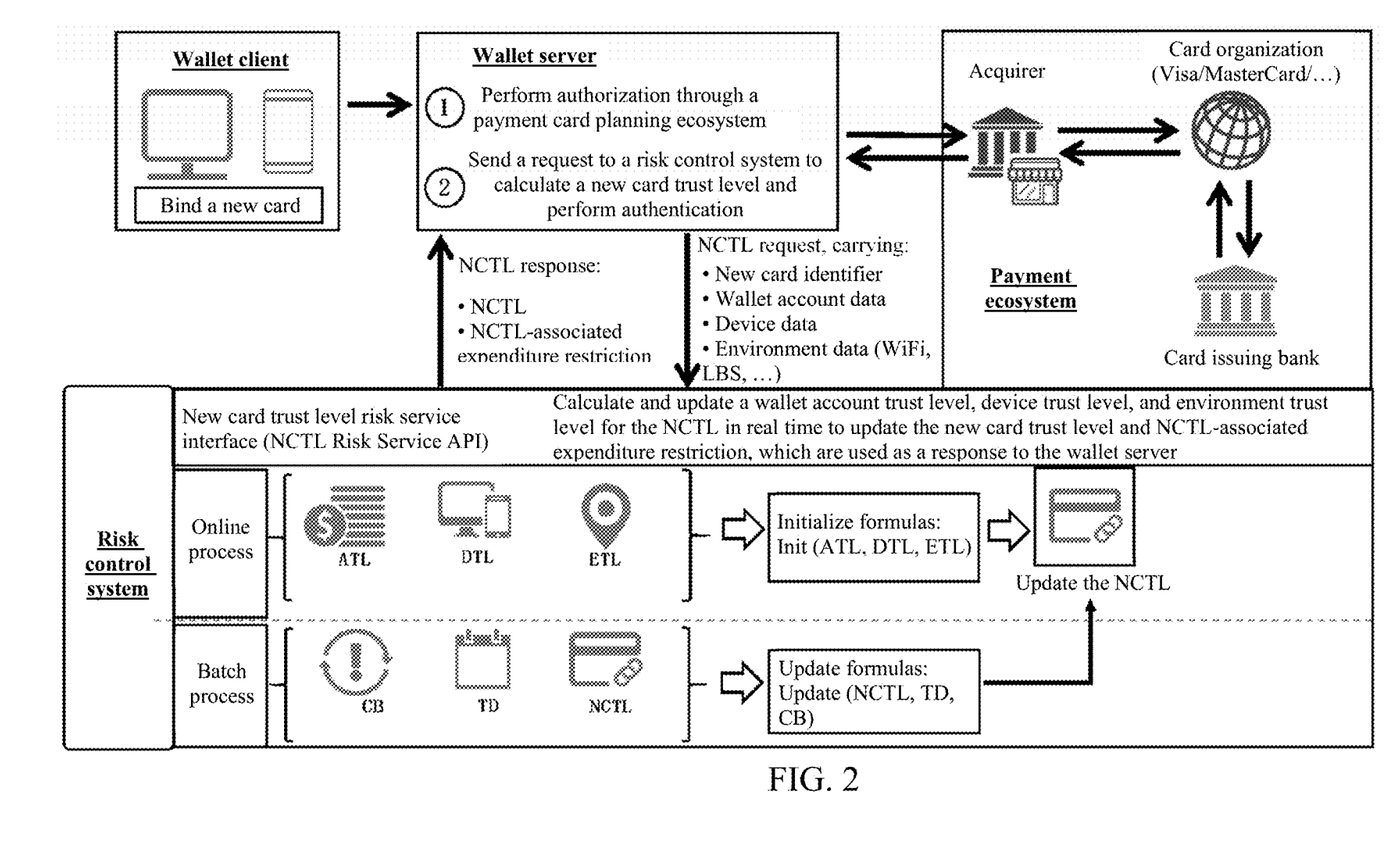
FIG. 2 is a flowchart of interaction of payment card binding with payment card trust evaluation, according to the specification.

FIG. 2 is a flowchart of interaction of payment card binding with payment card trust evaluation, according to the specification. In the embodiment shown in FIG. 2, information interaction among four parties including a wallet client, a wallet server, a payment ecosystem, and a risk control system may be included.

The wallet client, that is, the payment client of the embodiment shown in FIG. 1, may be configured to initiate a new card binding request.

The wallet server, that is, the payment server in the embodiment shown in FIG. 1, may respond to the new card binding request of the wallet client and perform operations related to new card binding.

The payment ecosystem, that is, the payment ecosystem of the embodiment shown in FIG. 1, is a provider of a payment service. In an embodiment shown in FIG. 2, the payment ecosystem may include an acquirer, a card organization, and a card issuer. The acquirer may provide payment and clearing services to a merchant and forward a transaction to the card connection organizations. The card organization may transfer the transaction to the card issuer, and is responsible for settlement among the acquirer and the card issuer. The card issuer is responsible for providing a card product to a consumer, such as a bank card applied at a bank, etc.

The risk control system, that is, the risk control system of the embodiment shown in FIG. 1, is configured to calculate and update of a wallet account trust level, a device trust level, and an environment trust level of the NCTL in real time, to update NCTL and NCTL-associated expenditure restrictions, which are used as a response from the wallet server. The risk control system may provide an API interface, and the wallet server may acquire, through the API interface, the NCTL corresponding to the new card and the wallet client account and/or payment restrictions corresponding to the NCTL.

Next, a solution process is described in detail.

Step 1. A wallet client sends a new card binding request to a wallet server.

In some embodiments, the new card binding request may include information of the wallet client and related parameters of the to-be-bound payment card. The wallet client may refer to a digital wallet client installed on a mobile computing device. The information of the wallet client may comprise device data of the mobile computing device, environment data of the mobile computing device, account information of the wallet client, and/or account information of the to-be-bound payment card.

The device data is, for example, a device identifier of the terminal device on which the wallet client is installed, a MAC address of the terminal device, etc. The environment data is, for example, a name of a WIFI connected to a terminal device at which the wallet client is located, a MAC address of the WIFI, a geographic location (latitude and longitude information) of the device, and an IP address field. The geographic location of the device is obtained, for example, through a location based service (LBS) of the terminal device. The account data may include: for example, a wallet client account ID, registration time, a customer name, a gender, an address, an age, a funding channel, and customer data modification history, etc. In some embodiments, the environment data may be treated as a part of the device data.

The related parameters of the to-be-bound payment card may include a payment card identifier and a payment card password. The account data may further include at least one of a verification code of the payment card, a mobile phone number bound to the payment card at a card issuing bank, a user identity of the payment card, and other pieces of information.

Step 2. The wallet server sends a payment request to the payment ecosystem.

Based on the new card binding request of the wallet client, the wallet server may send the payment request to the payment ecosystem to verify validity of a new card.

In some embodiments, the payment request may be a deposit request or a withdrawal request. The amount of the deposit or withdraw may be randomly generated as a small number, e.g., less than 25 cents. For example, the wallet server may, based on the account data of the to-be-bound payment card, send a withdrawal request to the payment ecosystem associated with the to-be-bound payment card through a withdrawal transaction message to verify the validity of the new card. For example, the payment server may initiate a random micro-withdrawal amount, such as 0.13 Yuan, and so on. After verifying the withdrawal request (e.g., by successfully processing the request), the payment ecosystem may return a success response.

Step 3. The wallet server sends a trust evaluation parameter acquisition request to the risk control system.

In the embodiment shown in FIG. 2, the wallet server may send the trust evaluation parameter acquisition request to the risk control system by invoking an NCTL Risk Service API to acquire trust evaluation parameters corresponding to the new card and the wallet client account. As shown in FIG. 2, as an input to the NCTL Risk Service API, an identifier of the to-be-bound payment card, the device data, and the environment data may be included.

Step 4. The risk control system calculates trust evaluation parameters.

The risk control system may obtain an account trust level (ATL) through calculation based on the wallet client account data.

The risk control system may obtain a device trust level (DTL) through calculation based on the device data.

The risk control system may obtain an environment trust level (ETL) through calculation based on the environment data.

ATL, DTL and ETL may be obtained through calculation based on corresponding trust level calculation models. The models may be machine learning models, e.g., classifiers, trained based on historical data.

Based on the ATL, DTL and ETL, a corresponding NCTL may be obtained for the risk control system. A manner of calculating NCTL may also be obtained based on an NCTL model. A training manner of the foregoing model may be obtained based on corresponding training data, which is not limited in the specification. In some embodiments, the NCTL model may be trained as a classifier, which provides a plurality of weights respectively corresponding to the ATL, DTL, and ETL. In some cases, if one of the weights is 0, the corresponding trust level (ATL, DTL, or ETL) may not ignored when determining the NCTL.

In some embodiments, the models for determining ATL, DTL, ETL, and NCTL may be trained based on historical data, including historical wallet-card binding requests of a plurality of wallet accounts bound with corresponding payment cards, and the historical transaction data of the wallet accounts. Each of the historical wallet-card binding requests may comprise various information, such as account information of the corresponding payment card, account data of the wallet client, device data of the computing device on which the wallet client is installed, and environment data of the computing device. According to the percentages of fraudulent or malicious transactions in the historical transaction data of a wallet account bound with a payment card, a quality score may be determined for the wallet account bound. The quality scores of the plurality of wallet accounts may be deemed as the labels for the corresponding wallet-card binding requests.

In some embodiments, parameters for determining the NCTL may include one or more of the ATL, DTL, and ETL, and may further include parameters except the ATL, DTL, and ETL, which are not limited in the specification.

In addition, based on the NCTL, the risk control system may further determine a payment limit corresponding to the NCTL.

Step 5. The risk control system feeds back the trust evaluation parameters.

As shown in FIG. 2, the risk control system may feed back to the wallet server NCTL and payment restrictions corresponding to the NCTL. In some embodiments, the risk control system may also feed only one of the NCTL and the payment restrictions back to the wallet server.

Step 6. The wallet server binds the payment card and a wallet client account.

Based on the trust evaluation parameters fed back by the risk control system, the wallet server may bind the payment card to wallet client account and set corresponding binding parameters, such as the NCTL, the payment limit, and so on.

In some embodiments, in a subsequent payment process, referring to the solution shown in FIG. 2, the payment server may also initiate a payment request to the payment ecosystem to process, and then send the payment request to the risk control system for verification. The risk control system may determine whether the payment request should be processed by the payment ecosystem based on the payment amount, the current NCTL, and payment restrictions of the payment card and wallet client account. If no, an offsetting request may be sent to the payment ecosystem.

In some embodiments, the payment server may receive a payment request to make a payment using the wallet client using the payment card. The payment server may first send the payment request to the risk control system for verification. The risk control system may determine whether the payment request should be processed by the payment ecosystem based on the payment amount, the current NCTL, and payment restrictions of the payment card and wallet client account. If yes, the payment server may send the payment request to the payment ecosystem to process.

In some embodiments, the risk control system may further adjust the NCTL corresponding to the payment card and the wallet client account based on payment refusal records, transaction records, and the current NCTL generated after the payment card is bound to the wallet client account.

In addition, In some embodiments, the payment server and the risk control system in the foregoing embodiments may also be combined into one system.

Figure 3:
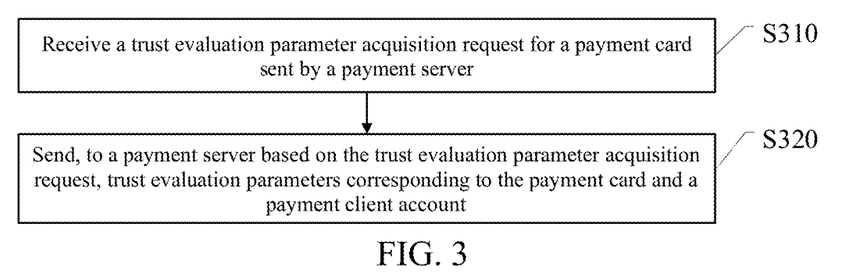
FIG. 3 is a flowchart of a payment card trust evaluation method, according to the specification.

FIG. 3 is a flowchart of a trust evaluation method for a payment card. The method of FIG. 3 is implemented by a risk control system. The method may include below.

S310. Receive a trust evaluation parameter acquisition request for a payment card sent by a payment server.

The trust evaluation parameter acquisition request is sent by the payment server when receiving payment success indication fed back by a payment ecosystem.

S320. Send, to the payment server based on the trust evaluation parameter acquisition request, trust evaluation parameters corresponding to the payment card and the payment client account.

The trust evaluation parameters are used by the payment server to bind the payment client account and the payment card, and determine payment limit restrictions.

In some embodiments, by receiving a trust evaluation parameter acquisition request sent by the payment server when the payment card is valid, the trust evaluation parameters are fed back to the payment server, for the payment server to bind the payment card based on the trust evaluation parameters. Therefore, a new card binding process is simplified, and a payment risk after the new card is bound is reduced.

In some embodiments, the trust evaluation parameter acquisition request carries: at least one of device data, environment data, and account data of the payment client, and a payment card identifier.

In some embodiments, step S320 may be specifically implemented below: a device trust level is determined based on the device data of the payment client; an environment trust level is determined based on the environment data of the payment client; an account trust level is determined based on the account data of the payment client; and the trust evaluation parameters are determined based on the device trust level, the environment trust level, and the account trust level.

In some embodiments, the trust evaluation parameters may also be determined based on one or two of the device trust level, the environment trust level, and the account trust level.

In some embodiments, the trust evaluation parameter includes at least one of the following: a payment card trust level and payment restrictions associated with the payment card trust level.

In some embodiments, the method further includes: based on the payment refusal data, transaction data, and trust evaluation parameters after the payment card is bound to the payment client account, the trust evaluation parameters corresponding to the payment card and the payment client account are adjusted.

In some embodiments, the method further includes: a verification request sent by the payment server is received, the verification request being used to request to perform verification to determine whether to allow a payment request for the payment card under the payment client account; and a response to the verification request is fed back to the payment server based on current trust evaluation parameters of the payment card and the payment client account.

For specific implementation of the embodiment shown in FIG. 3, reference may be made to the method performed by the risk control system in the embodiments shown in FIG. 1 and FIG. 2, and details thereof are not described in the specification.

Embodiments of the specification are described above. Other embodiments fall within the scope of the appended claims. In some embodiments, the actions or steps recorded in the claims may be performed in sequences different from those in the embodiments and an expected result may still be achieved. In addition, the processes depicted in the accompanying drawings do not necessarily require specific sequences or consecutive sequences to achieve an expected result. In some implementations, multitasking and parallel processing may be feasible or beneficial.

Figure 4:
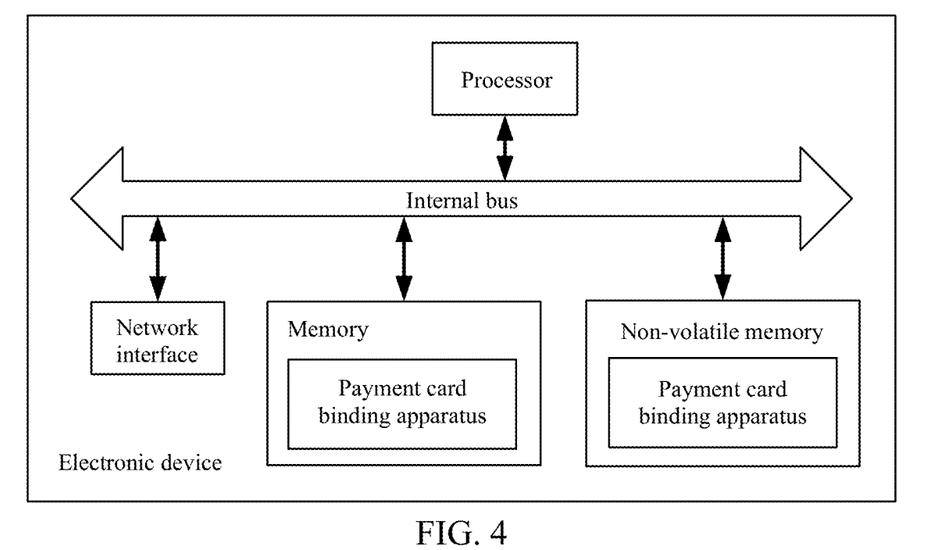
FIG. 4 is a schematic structural diagram of an electronic device, according to the specification.

FIG. 4 is a schematic structural diagram of an electronic device according to the specification. Referring to FIG. 4, at the hardware level, the electronic device includes a processor, and In some embodiments, includes an internal bus, a network interface, and a memory. The memory may include a memory, for example, a random access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 4, the bus is represented by using only one double-sided arrow. This, however, does not indicate that there is only one bus or only one type of bus.

The memory is configured to store a program. Specifically, the program may include program code, where the program code includes a computer operation instruction. The memory may include an internal memory and a non-volatile memory, and provide instructions and data to the processor.

The processor reads a corresponding computer program from the non-volatile memory into the memory and then executes the computer program, to form a payment card binding apparatus at the logic level. The processor executes the program stored in the memory and is specifically configured to perform the following operations: sending, based on a payment card binding request sent by a payment client, a first payment request to a payment ecosystem; when the payment is successful, determining, based on at least one of device data, environment data, and account data of the payment client, trust evaluation parameters corresponding to a payment card and a payment client account; and performing, based on the trust evaluation parameters, binding configuration on the payment client account and the payment card, the trust evaluation parameters being used to determine payment limit restrictions.

The method performed by the payment card binding apparatus disclosed in the embodiment shown in FIG. 1 of the specification may be applied to a processor, or may be implemented by a processor. The processor may be an integrated circuit chip and has a signal processing capability. In an implementation process, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. It may implement or perform the methods, the steps, and logical block diagrams that are disclosed in the embodiments of the specification. The general-purpose processor may be a microprocessor, or the processor may be any conventional processor or the like. Steps of the methods disclosed with reference to the embodiments of the specification may be directly performed and completed by using a hardware decoding processor, or may be performed and completed by using a combination of hardware and a software module in the decoding processor. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may also perform the method of FIG. 1 and implement the functions of the payment server or the wallet server in the embodiments shown in FIG. 1 and FIG. 2, and details are not described again in the specification.

In some embodiments, in addition to a software implementation, the electronic device in the specification does not exclude other implementations, for example, a logic device or a combination of software and hardware. In other words, an entity executing the following processing procedure is not limited to the logic units, and may also be hardware or logic devices.

The specification further provides a computer readable storage medium. The computer readable storage medium stores one or more programs, the one or more programs include an instruction, and when the instruction is executed by a portable electronic device including a plurality of applications, the portable electronic device is enabled to perform the method in the embodiment shown in FIG. 1, and specifically perform the following operations: sending, based on a payment card binding request sent by a payment client, a first payment request to a payment ecosystem; when the payment is successful, determining, based on at least one of device data, environment data, and account data of the payment client, trust evaluation parameters corresponding to a payment card and a payment client account; and performing, based on the trust evaluation parameters, binding configuration on the payment client account and the payment card, the trust evaluation parameters being used to determine payment limit restrictions.

Figure 5:
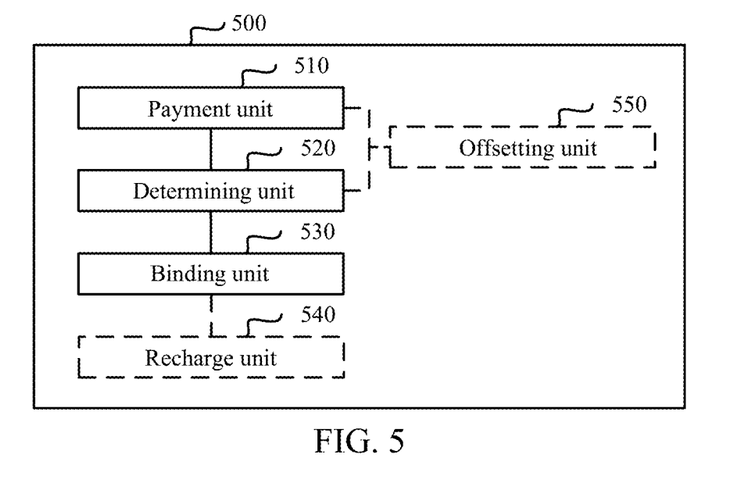
FIG. 5 is a schematic structural diagram of a payment card binding apparatus, according to the specification.

FIG. 5 is a schematic structural diagram of a payment card binding apparatus, according to the specification. Referring to FIG. 5, in a software implementation, a payment card binding apparatus 500 may include: a payment unit 510 configured to send, based on a payment card binding request sent by a payment client, a first payment request to a payment ecosystem; a determining unit 520 configured to, when the payment is successful, determine, based on at least one of device data, environment data, and account data of the payment client, trust evaluation parameters corresponding to a payment card and a payment client account; and a binding unit 530 configured to perform, based on the trust evaluation parameters, binding configuration on the payment client account and the payment card, the trust evaluation parameters being used to determine payment limit restrictions.

In the specification, the validity of the payment card is determined by initiating a payment to the payment card to be bound to the payment client, and based on at least one of the account data, the device data, and the environment data of the payment client, the trust evaluation parameter of the payment card is determined. Therefore, the binding process is simplified, and a payment risk after the new card is bound is reduced.

In some embodiments, the determining unit 520 is specifically configured to: send, to the risk control system, a trust evaluation parameter acquisition request about the payment card and the payment client account, the trust evaluation parameter acquisition request carrying at least one of the device data, the environment data, and the account data of the payment client, and the payment card identifier; and receive a trust evaluation parameter fed back by the risk control system based on the trust evaluation parameter acquisition request.

In some embodiments, the trust evaluation parameter includes at least one of the following: a payment card trust level and payment restrictions associated with the payment card trust level.

In some embodiments, the binding unit 530 is specifically configured to: when the payment client account is bound to the payment card, based on the trust evaluation parameters, set at least one of a trust level and payment restrictions of the payment card in the payment client account.

In some embodiments, the payment card binding apparatus 500 further includes a recharge unit 540 to recharge a payment amount in the first payment request into the payment client account.

In some embodiments, the payment unit 510 further sends, to the payment ecosystem, a second payment request for the payment card under the payment client account.

The determining unit 520 further performs a trust evaluation on the second payment request to determine whether to allow the second payment request.

In some embodiments, the payment card binding apparatus 500 further includes an offsetting unit 550. If the second payment request is not allowed, offsetting is performed to the payment ecosystem based on the second payment request.

In some embodiments, the determining unit 520 is further configured to: send, to the risk control system, a verification request for the second payment request, the verification request carrying the payment card identifier, the payment client account, and the payment amount of the second payment request; and receive from the risk control system a response to the verification request, the response being determined by the risk control system based on the trust evaluation parameters corresponding to the payment card and the payment client account, and the payment amount of the second payment request.

In some embodiments, the response further carries the trust evaluation parameters adjusted by the risk control system. The binding unit 530 is further configured to reset binding parameters of the payment client account and the payment card based on the adjusted trust evaluation parameters.

In some embodiments, the payment ecosystem includes an acquirer subsystem, a card solution subsystem, and a card issuer subsystem.

For the payment card binding device, the method in FIG. 1 may be further performed, and the functions of the payment server or wallet server in the embodiments shown in FIG. 1 and FIG. 2 are implemented, and details are not described again in the specification.

Figure 6:
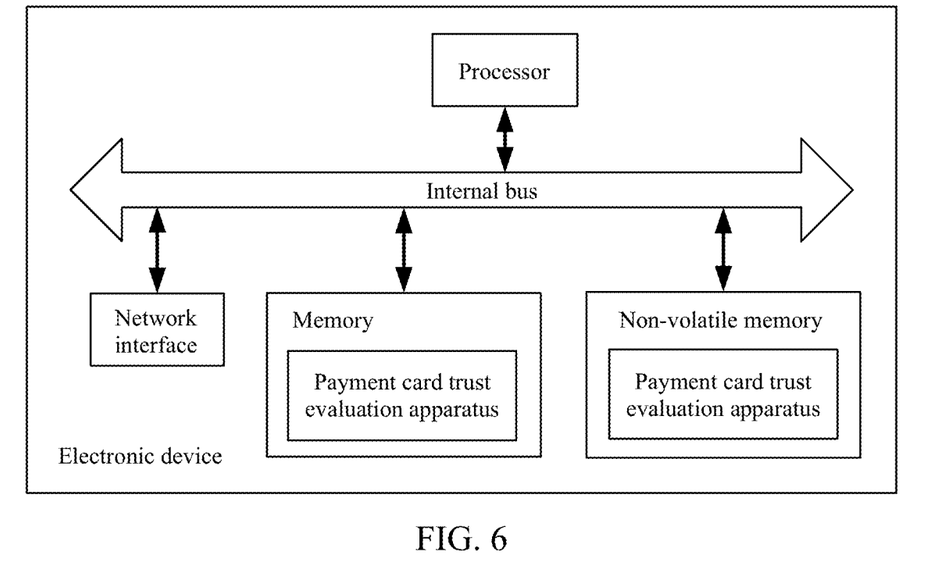
FIG. 6 is a schematic structural diagram of an electronic device, according to the specification.

FIG. 6 is a schematic structural diagram of an electronic device according to the specification. Referring to FIG. 6, at the hardware level, the electronic device includes a processor, and In some embodiments, includes an internal bus, a network interface, and a memory. The memory may include a memory, for example, a random access memory (RAM), or may further include a non-volatile memory, for example, at least one magnetic disk memory. Certainly, the electronic device may further include hardware required for other services.

The processor, the network interface, and the memory may be connected to each other through the internal bus. The internal bus may be an industry standard architecture (ISA) bus, a peripheral component interconnect (PCI) bus, or an extended industry standard architecture (EISA) bus. The bus may be classified into an address bus, a data bus, a control bus, and the like. For ease of illustration, in FIG. 6, the bus is represented by using only one double-sided arrow. This, however, does not indicate that there is only one bus or only one type of bus.

The memory is configured to store a program. Specifically, the program may include program code, where the program code includes a computer operation instruction. The memory may include an internal memory and a non-volatile memory, and provide instructions and data to the processor.

The processor reads a corresponding computer program from the non-volatile memory into the memory and then executes the computer program, to form a payment card trust evaluation apparatus at the logic level. The processor executes the program stored in the memory and is specifically configured to perform the following operations: receiving a trust evaluation parameter acquisition request for a payment card sent by a payment server, where the trust evaluation parameter acquisition request is sent by the payment server when receiving a payment success indication fed back by a payment ecosystem; and sending, to the payment server based on the trust evaluation parameter acquisition request, trust evaluation parameters corresponding to the payment card and the payment client account, where the trust evaluation parameters are used by the payment server to bind the payment client account to the payment card and determine payment limit restrictions.

The method performed by the payment card trust evaluation apparatus or risk control system disclosed in the embodiment shown in FIG. 3 of the specification may be applied to a processor, or may be implemented by a processor. The processor may be an integrated circuit chip and has a signal processing capability. In an implementation process, steps of the foregoing method may be implemented by using a hardware integrated logic circuit in the processor or instructions in a form of software. The processor may be a general processor, including a central processing unit (CPU), a network processor (NP), and the like; or may further be a digital signal processor (DSP), an application-specific integrated circuit (ASIC), a field programmable gate array (FPGA), or another programmable logical device, discrete gate or transistor logical device, or discrete hardware component. It may implement or perform the methods, the steps, and logical block diagrams that are disclosed in the embodiments of the specification. The general-purpose processor may be a microprocessor, or the processor may be any conventional processor or the like. Steps of the methods disclosed with reference to the embodiments of the specification may be directly performed and completed by using a hardware decoding processor, or may be performed and completed by using a combination of hardware and a software module in the decoding processor. The software module may be located in a mature storage medium in the art, such as a RAM, a flash memory, a ROM, a programmable ROM, an electrically erasable programmable memory, or a register. The storage medium is located in the memory, and the processor reads information in the memory and completes the steps in the foregoing methods in combination with hardware of the processor.

The electronic device may also perform the method of FIG. 3 and implement the functions of the risk control system in the embodiments shown in FIG. 3 and FIG. 2, and details are not described again in the specification.

In some embodiments, in addition to a software implementation, the electronic device in the specification does not exclude other implementations, for example, a logic device or a combination of software and hardware. In other words, an entity executing the following processing procedure is not limited to the logic units, and may also be hardware or logic devices.

The specification further provides a computer readable storage medium. The computer readable storage medium stores one or more programs, the one or more programs include an instruction, and when the instruction is executed by a portable electronic device including a plurality of applications, the portable electronic device is enabled to perform the method in the embodiment shown in FIG. 3, and specifically perform the following operations: receiving a trust evaluation parameter acquisition request for a payment card sent by a payment server, where the trust evaluation parameter acquisition request is sent by the payment server when receiving a payment success indication fed back by a payment ecosystem; and sending, to the payment server based on the trust evaluation parameter acquisition request, trust evaluation parameters corresponding to the payment card and the payment client account, where the trust evaluation parameters are used by the payment server to bind the payment client account to the payment card and determine payment limit restrictions.

Figure 7:
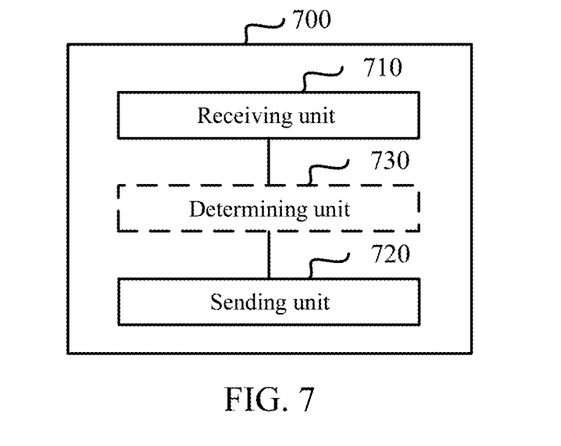
FIG. 7 is a schematic structural diagram of a payment card trust evaluation apparatus, according to the specification.

FIG. 7 is a schematic structural diagram of a payment card trust evaluation apparatus, according to the specification. Referring to FIG. 7, in a software implementation, a payment card trust evaluation apparatus may include:

a receiving unit 710 configured to receive a trust evaluation parameter acquisition request for a payment card sent by a payment server, where the trust evaluation parameter acquisition request is sent by the payment server when receiving a payment success indication fed back by a payment ecosystem; and a sending unit 720 configured to send, to the payment server based on the trust evaluation parameter acquisition request, trust evaluation parameters corresponding to the payment card and the payment client account, where the trust evaluation parameter is used by the payment server to bind the payment client account to the payment card and determine payment limit restrictions.

In the specification, by receiving a trust evaluation parameter acquisition request sent by the payment server when the payment card is valid, the trust evaluation parameters are fed back to the payment server, for the payment server to bind the payment card based on the trust evaluation parameters. Therefore, a new card binding process is simplified, and a payment risk after the new card is bound is reduced.

In some embodiments, the trust evaluation parameter acquisition request carries at least one of device data, environment data, and account data of the payment client, and a payment card identifier.

In some embodiments, the payment card trust evaluation apparatus may further include a determining unit 730.

The determining unit 730 determines a device trust level based on the device data of the payment client; determines an environment trust level based on the environment data of the payment client; determines an account trust level based on the account data of the payment client; and determines the trust evaluation parameters based on the device trust level, the environment trust level, and the account trust level.

In some embodiments, the trust evaluation parameter includes at least one of the following: a payment card trust level and payment restrictions associated with the payment card trust level.

In some embodiments, the determining unit 730 may further adjust, based on payment refusal data, transaction data, and trust evaluation parameters, the trust evaluation parameters corresponding to the payment card and the payment client account after the payment card is bound to the payment client account.

In some embodiments, the receiving unit 710 is further configured to: receive a verification request sent by the payment server, the verification request being used to request to perform verification to determine whether to allow a payment request for the payment card under the payment client account.

The sending unit 720 is further configured to: feed a response to the verification request back to the payment server based on current trust evaluation parameters of the payment card and the payment client account.

For the payment card trust evaluation apparatus, the method in FIG. 3 may be further performed, and the functions of the risk control system in the embodiments shown in FIG. 3 and FIG. 2 are implemented, and details are not described again in the specification.

The foregoing descriptions are merely preferred embodiments of the specification and are not intended to limit the protection scope of the specification. Any modification, equivalent replacement, or improvement made without departing from the spirit and principle of the specification shall fall within the protection scope of the specification.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition in the specification, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

The embodiments in the specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

What is claimed is:

1. A computer-implemented method, comprising:
receiving, at a server, a payment card binding request from a digital wallet client installed on a computing device of a user to bind a new payment card of the user with a digital wallet account, wherein the payment card binding request comprises account data of the digital wallet account, device data of the computing device, environment data of the computing device, and account information of the payment card, wherein:
the account data comprises: an account identifier, a registration time, or personal information of an account owner;
the device data comprises: a device identifier of the computing device or a media access control (MAC) address of the computing device; and
the environment data comprises: a name of a wireless network connected to the computing device, an IP address of the computing device, or location information of the computing device;
sending a micro charge payment request from the server to a payment system according to the account information of the payment card, wherein the micro charge payment request is to verify the validity of the payment card;
in response to the micro charge payment request being successfully processed by the payment system, sending from the server to a risk control system associated with the server a request to determine (1) an account trust level based on the account data, (2) a device trust level based on the device data, and (3) an environment trust level based on the environment data, wherein the risk control system is configured to:
input the determined account trust level, the device trust level, and the environment trust level into a trained new card trust level (NCTL) model to determine a NCTL, wherein the NCTL model is trained to provide a plurality of weights respectively corresponding to the account trust level, the device trust level, and the environment trust level, and wherein the NCTL model is trained based on a plurality of historical payment card binding requests of a plurality of wallet accounts, and historical transaction data of the plurality of wallet accounts; and
determine, based on the NCTL, a payment limit restriction for the digital wallet account using the payment card on the computing device;
binding, at the server, based on the NCTL and the payment limit restriction, the digital wallet account with the payment card for the digital wallet account to use the payment card for future payments;

receiving, at the server, a subsequent payment request to make a payment with the digital wallet account using the payment card;

sending, from the server to the risk control system, a verification request to perform verification to determine whether to allow the subsequent payment request, wherein the verification is based on a payment amount of the subsequent payment request and the NCTL and the payment limit restriction at the time of the subsequent payment request;

receiving, at the server, from the risk control system, a response to the verification request; and wherein the risk control system is configured to adjust the NCTL and the payment limit restriction based on transaction records or payment refusal records generated after the payment card is bound to the digital wallet account.

2. The method according to claim 1, wherein sending the micro charge payment request to the payment system according to the account information of the payment card comprises:

sending a withdrawal request to the payment system to withdraw a randomly generated payment amount from an account associated with the payment card; and receiving a success response from the payment system after the payment system approves the withdrawal request.

3. The method according to claim 2, further comprising: recharging the randomly generated payment amount into the account associated with the payment card.

4. The method according to claim 1, further comprising: adjusting the NCTL based on payment refusal records and transaction records that occurred after the digital wallet account is bound with the payment card.

5. The method according to claim 1, further comprising:

sending the subsequent payment request to the payment system to process;

determining whether the subsequent payment request should be processed by the payment system according to the payment amount and the payment limit restriction; and if not, sending an offset request to the payment system to revoke the second payment request.

6. The method according to claim 1, further comprising:

determining whether the subsequent payment request should be processed according to the payment amount and the payment limit restriction; and if yes, sending the subsequent payment request to the payment system to process.

7. The method according to claim 1, wherein sending from the server to the risk control system the request to determine (1) the account trust level based on the account data, (2) the device trust level based on the device data, and (3) the environment trust level based on the environment data comprises:

sending through an API of the risk control system, the account data of the digital wallet account, the device data of the computing device, and the environment data of the computing device to the risk control system.

8. A system comprising one or more processors and one or more non-transitory computer-readable storage mediums storing instructions executable by the one or more processors to cause the system to perform operations comprising:

receiving, at a server, a payment card binding request from a digital wallet client installed on a computing device of a user to bind a new payment card of the user with a digital wallet account, wherein the payment card binding request comprises account data of the digital wallet account, device data of the computing device, environment data of the computing device, and account information of the payment card, wherein:

the account data comprises: an account identifier, a registration time, or personal information of an account owner;

the device data comprises: a device identifier of the computing device or a media access control (MAC) address of the computing device; and the environment data comprises: a name of a wireless network connected to the computing device, an IP address of the computing device, or location information of the computing device;

sending a micro charge payment request from the server to a payment system according to the account information of the payment card, wherein the micro charge payment request is to verify the validity of the payment card;

in response to the micro charge payment request being successfully processed by the payment system, sending from the server to a risk control system associated with the server a request to determine (1) an account trust level based on the account data, (2) a device trust level based on the device data, and (3) an environment trust level based on the environment data, wherein the risk control system is configured to:

input the determined account trust level, the device trust level, and the environment trust level into a trained new card trust level (NCTL) model to determine a NCTL, wherein the NCTL model is trained to provide a plurality of weights respectively corresponding to the account trust level, the device trust level, and the environment trust level, and wherein the NCTL model is trained based on a plurality of historical payment card binding requests of a plurality of wallet accounts, and historical transaction data of the plurality of wallet accounts; and determine, based on the NCTL, a payment limit restriction for the digital wallet account using the payment card on the computing device;

binding, at the server, based on the NCTL and the payment limit restriction, the digital wallet account with the payment card for the digital wallet account to use the payment card for future payments;

receiving, at the server, a subsequent payment request to make a payment with the digital wallet account using the payment card;

sending, from the server to the risk control system, a verification request to perform verification to determine whether to allow the subsequent payment request, wherein the verification is based on a payment amount of the subsequent payment request and the NCTL and the payment limit restriction at the time of the subsequent payment request;

receiving, at the server, from the risk control system, a response to the verification request; and wherein the risk control system is configured to adjust the NCTL and the payment limit restriction based on transaction records or payment refusal records generated after the payment card is bound to the digital wallet account.

9. The system according to claim 8, wherein sending the micro charge payment request to the payment system according to the account information of the payment card comprises:
   sending a withdrawal request to the payment system to withdraw a randomly generated payment amount from an account associated with the payment card; and
   receiving a success response from the payment system after the payment system approves the withdrawal request.

10. The system according to claim 8, wherein the operations further comprise:
   sending the subsequent payment request to the payment system to process;
   determining whether the subsequent payment request should be processed by the payment system according to the payment amount and the payment limit restriction; and
   if not, sending an offset request to the payment system to revoke the second payment request.

11. The system according to claim 8, wherein the operations further comprise:
   determining whether the subsequent payment request should be processed according to the payment amount and the payment limit restriction; and
   if yes, sending the subsequent payment request to the payment system to process.

12. One or more non-transitory computer-readable storage mediums configured with instructions executable by one or more processors to cause the one or more processors to perform operations comprising:
   receiving, at a server, a payment card binding request from a digital wallet client installed on a computing device of a user to bind a new payment card of the user with a digital wallet account, wherein the payment card binding request comprises account data of the digital wallet account, device data of the computing device, environment data of the computing device, and account information of the payment card, wherein:
      the account data comprises: an account identifier, a registration time, or personal information of an account owner;
      the device data comprises: a device identifier of the computing device or a media access control (MAC) address of the computing device; and
      the environment data comprises: a name of a wireless network connected to the computing device, an IP address of the computing device, or location information of the computing device;
   sending a micro charge payment request from the server to a payment system according to the account information of the payment card, wherein the micro charge payment request is to verify the validity of the payment card;
   in response to the micro charge payment request being successfully processed by the payment system, sending from the server to a risk control system associated with the server a request to determine (1) an account trust level based on the account data, (2) a device trust level based on the device data, and (3) an environment trust level based on the environment data, wherein the risk control system is configured to:
      input the determined account trust level, the device trust level, and the environment trust level into a trained new card trust level (NCTL) model to determine a NCTL, wherein the NCTL model is trained to provide a plurality of weights respectively corresponding to the account trust level, the device trust level, and the environment trust level, and wherein the NCTL model is trained based on a plurality of historical payment card binding requests of a plurality of wallet accounts, and historical transaction data of the plurality of wallet accounts; and
      determine, based on the NCTL, a payment limit restriction for the digital wallet account using the payment card on the computing device;
   binding, at the server, based on the NCTL and the payment limit restriction, the digital wallet account with the payment card for the digital wallet account to use the payment card for future payments;
   receiving, at the server, a subsequent payment request to make a payment with the digital wallet account using the payment card;
   sending, from the server to the risk control system, a verification request to perform verification to determine whether to allow the subsequent payment request, wherein the verification is based on a payment amount of the subsequent payment request and the NCTL and the payment limit restriction at the time of the subsequent payment request;
   receiving, at the server, from the risk control system, a response to the verification request; and
   wherein the risk control system is configured to adjust the NCTL and the payment limit restriction based on transaction records or payment refusal records generated after the payment card is bound to the digital wallet account.

13. The one or more non-transitory computer-readable storage mediums according to claim 12, wherein sending the micro charge payment request to the payment system according to the account information of the payment card comprises:
   sending a withdrawal request to the payment system to withdraw a randomly generated payment amount from an account associated with the payment card; and
   receiving a success response from the payment system after the payment system approves the withdrawal request.

14. The one or more non-transitory computer-readable storage mediums according to claim 12, wherein the operations further comprise:
   sending the subsequent payment request to the payment system to process;
   determining whether the subsequent payment request should be processed by the payment system according to the payment amount and the payment limit restriction; and
   if not, sending an offset request to the payment system to revoke the second payment request.

15. The one or more non-transitory computer-readable storage mediums according to claim 12, wherein the operations further comprise:
   determining whether the subsequent payment request should be processed according to the payment amount and the payment limit restriction; and
   if yes, sending the subsequent payment request to the payment system to process.

* * * * *